United States Patent
Ionov

(10) Patent No.: US 6,603,905 B1
(45) Date of Patent: *Aug. 5, 2003

(54) LAUNCH PORT FOR PUMPING FIBER LASERS AND AMPLIFIERS

(75) Inventor: Stanislav I. Ionov, Calabasas, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/518,990

(22) Filed: Mar. 3, 2000

(51) Int. Cl.$^7$ ............................. H04B 10/12; G02B 6/42
(52) U.S. Cl. .................... 385/39; 359/341.1; 359/341.3
(58) Field of Search ................................ 359/333–342, 359/349; 385/32, 39; 372/6

(56) References Cited

U.S. PATENT DOCUMENTS

| | | | |
|---|---|---|---|
| 3,456,211 A | 7/1969 | Koester | 331/94.5 |
| 4,676,584 A | 6/1987 | Perlin | 350/96.15 |
| 4,847,843 A | 7/1989 | Byron et al. | 372/42 |

(List continued on next page.)

FOREIGN PATENT DOCUMENTS

| | | |
|---|---|---|
| EP | 0 320 990 A | 6/1989 |
| EP | 0 840 410 A | 5/1998 |
| EP | 0 840 411 A | 5/1998 |

(List continued on next page.)

OTHER PUBLICATIONS

Forrest, G.T., "Japenese Exhibit Next–Generation Fiberoptic Devices", *Laser Focus World*, vol. 25, No. 10, pp. 145–146 (1989).

Primary Examiner—Hemang Sanghavi
Assistant Examiner—Omar Rojas
(74) Attorney, Agent, or Firm—Ladas & Parry

(57) ABSTRACT

A method and apparatus is disclosed for coupling substantial optical power into an optical fiber from the side without encumbering ends of the fiber. A special optical fiber having a gain medium preferably including rare earth dopants in the core is provided for carrying optical information signals, and for amplifying the information signals when the gain medium is stimulated with pump light. Launch sections are selected at intervals along the special fiber with absorptive loops therebetween. The launch sections are stripped to their inner cladding layer, which preferably has a rectangular cross section, and are positioned adjacent each other on a support block to form a launch region which is upwardly convex. The support block presents a low refraction index surface to the fiber. Pump light is provided, preferably by one or more stripe diodes about 1–3 microns wide and about as long as the total width of the adjacent launch sections. The pump light is focused by appropriate optics into a launch port, the launch port having a refractive index substantially matching that of the cladding layer, and being optically mated with the adjacent launch sections. The launch port guides the pump light into the launch sections in a direction generally parallel to the tangent of the launch section axes. Pump light may be provided, for example, by a single diode stripe, or the light from two diode stripes may be combined by polarization control, and such combined beams may be directed into the launch port from a single side or from different sides. A first reflective face may be formed on the launch port to reflect unabsorbed pump light back into the cladding from which it is re-emerging into the launch port. The first reflective face may be made transmissive to another wavelength of light directed into the face, while a second face is made inversely transmissive and reflective, permitting reflective recapture of residual light from two different pump beams, each of which can be a combination of two source beams. As the pump light travels along the special fiber in the absorptive loops between the launch sections, it is significantly absorbed by the gain medium in the signal-carrying core, where it generates signal light in the core or amplifies existing signal light. The special fiber may have single cladding or double cladding.

33 Claims, 5 Drawing Sheets

U.S. PATENT DOCUMENTS

| | | | | |
|---|---|---|---|---|
| 4,852,117 | A | | 7/1989 | Po .............................. 372/97 |
| 5,140,456 | A | | 8/1992 | Huber ....................... 359/341 |
| 5,619,522 | A | | 4/1997 | Dubé ......................... 372/72 |
| 5,659,644 | A | | 8/1997 | DiGiovanni et al. .......... 385/31 |
| 5,815,309 | A | * | 9/1998 | Lawrence et al. .......... 359/333 |
| 5,923,694 | A | * | 7/1999 | Culver .......................... 372/6 |
| 6,052,220 | A | * | 4/2000 | Lawrence et al. .......... 359/341 |
| 6,052,392 | A | | 4/2000 | Ueda et al. .................... 372/6 |
| 6,198,569 | B1 | * | 3/2001 | Lawrence et al. .......... 359/333 |
| 6,317,537 | B1 | * | 11/2001 | Ionov et al. ................. 385/32 |

FOREIGN PATENT DOCUMENTS

| | | | | | |
|---|---|---|---|---|---|
| JP | 62-299919 | | 12/1987 | | |
| WO | WO 93/15536 | | 8/1993 | | |
| WO | WO 93/15536 | * | 9/1993 | ............. | H01S/3/06 |
| WO | WO 95/10868 | | 4/1995 | | |
| WO | WO 96/20519 | | 7/1996 | | |
| WO | WO 99/43057 | | 8/1999 | | |
| WO | 01/67559 A2 | | 9/2001 | | |

* cited by examiner

LAUNCH PORT FOR PUMPING FIBER LASERS AND AMPLIFIERS

FIELD OF THE INVENTION

This invention relates to the field of fiber optics, more particularly to the field of pumping optical fibers to generate or increase output power from fiber optic based devices, and specifically to mechanisms for launching pumping light into optical fibers.

BACKGROUND

In the field of fiber optic systems, fiber optic guides transmit light power from a light source to a utilization device. Referring to FIG. 1, light source 10 transmits light signal $P_S$ 11 at wavelength $\lambda_S$ through fiber 12 to utilization device 14. Couplings between light source 10, utilization device 14 and fiber 12 are well known in the art and are not shown. Fiber 12 includes core 16, cladding 18 and protective covering 20. Light source 10 typically provides the optical signals carrying information which propagates in the core. This fiber is considered a single-clad fiber. There are also double-clad fibers. A double-clad fiber has a core, a first cladding, a second cladding and the protective coating. In the double-clad case, while a single-mode signal can propagate in the core, a multi-mode signal can be coupled into the inner cladding, whereupon the inner cladding acts as a core for the second cladding.

Numerous applications require the generation or amplification of optical signals. Fiber optics systems used in a large variety of commercial and military applications, such as in telecommunications, inter-satellite optical communications, and for missile radar tracking systems, require generation and amplification of optical signals.

Fiber optic guides ("fibers") typically have at least two essential parts. One part is the core where light propagates. The other part is cladding surrounding the core which creates conditions whereby the light propagates only in the core. These fibers are capable of transmitting single mode optical signals in the core without amplification, and produce a small amount of background loss. These can be considered "regular" fibers.

"Special" fibers providing a gain medium typically include a core doped with rare earth atoms such as erbium (Er), ytterbium (Yb), erbium-ytterbium (ErYb), neodymium (Nd), thulium (Tm), etc., and are utilized in applications requiring the generation or amplification of optical signals. When subjected to optical energy (typically 800–1400 nm wavelength depending on the gain medium), these special fibers have atoms excited to their upper lasing level, and when thus excited they are capable of generating or amplifying optical signals. The special fibers providing the gain medium may be spliced to regular fibers, which then transmit the optical signals which have been generated or amplified in the gain medium.

A typical fiber amplifier has a source of optical signal coupled to a rare earth doped "special" fiber gain medium. Coupled also to the gain medium is an optical "pump" source to input optical power into the gain medium, and a utilization device to receive an amplified optical signal as output from the gain medium. Referring to FIG. 2, in a typical fiber optic amplification system gain medium 22 is coupled with source fiber 10 to permit light signal $P_S$ 11 at wavelength $\lambda_S$ to be amplified when combined with pump, light signal $P_P$ at wavelength $\lambda_P$ to provide amplified signal $AP_S$ at wavelength $\lambda_S$ for use by utilization device 14.

Those skilled in the art can appreciate that the more pump power that is coupled into a rare earth doped fiber, the more optical signal output is provided by the gain medium. One form of gain medium 22 is described in PCT Publication WO 96/20519, entitled "A Coupling Arrangement Between A Multimode Light Source and An Optical Fiber Through An Intermediate Optical Fiber Length", wherein a progressively tapered fiber portion is fused to the inner cladding of a double clad fiber carrying an optical information signal in its core. This fused system is shown schematically in FIG. 3 of the present application. However, while the spliced coupling allows the ability to have multiple locations available to input the pump power into a single fiber and achieve power scalability with unrestricted access to both fiber ends, such fused fiber couplers are somewhat difficult to manufacture.

There are various ways to couple pump power into special fiber. In most applications, fiber lasers and amplifiers are end-pumped by single-mode diode lasers whose output is coupled directly into the core of the fiber. The maximum output power achieved with such pumping schemes is currently about 100 mW. This is partly because 100–200 mW is typically the maximum power level that can be coupled into a fiber core at the lowest transverse mode from a readily manufactured semiconductor laser.

Unfortunately, there are applications, such as for space communications, which require multi-watt levels of pumping. Such higher output powers are generally achieved by using double-cladding fibers. These fibers have a doped single-mode core surrounded by a multi-mode inner cladding that guides pump radiation along the fibers. Typically, the pump radiation is launched into the inner cladding at one of the fiber ends with some kind of coupling optics. The maximum output power of such devices is limited by the brightness of available pump diodes, but tens of watts of output power have been demonstrated at specific wavelengths. The drawbacks of such configurations lie in stringent high-brightness requirements for the pump sources, limited accessibility of fiber ends, and in the difficulties in scaling to higher powers.

Efficient optical pumping of a single-mode fiber laser or an amplifier presents a serious challenge, especially when high output powers are required. Typical end pumping requires high-brightness-pump sources, limits scalability to higher powers, and restricts access to fiber ends, and known side-pumping techniques are difficult to manufacture. Accordingly, there exists a need for an effective, easy to manufacture method and apparatus for use in pumping fiber lasers and amplifiers which provides access to both fiber ends, enables scalability to high output powers, and is relatively straightforward and inexpensive to manufacture.

SUMMARY OF THE INVENTION

The present invention addresses the above-identified needs, providing a method and apparatus to achieve efficient and scalable optical power pumping into a single fiber while allowing unrestricted access to both fiber ends. Moreover, devices embodying the invention may be made for use with either single- or double-clad fibers, and are relatively inexpensive to manufacture.

In accordance with the present invention, a pumping fiber section includes a doped optical fiber core surrounded by a cladding layer having a cladding index of refraction. The pumping fiber section has a plurality of launch sections defined along the fiber and separated from each other by absorptive sections. Each launch section is stripped down to a first inner cladding layer. The pumping fiber is arranged to bring the plurality of launch sections into close proximity to each other on a substrate. The substrate provides a transparent low refraction index material in optical contact with the cladding and imparts a common radius to the adjacent fiber sections to form an upwardly convex launch region. This launch region is then mated to a launch port which matches the cladding index of refraction. Mating is effected by polishing the launch region flat and gluing the launch port thereto with a low-loss, index matched optical glue. The launch port accepts optical pump power on one or more sides from a pump light source such as a laser diode stripe, and conveys the pump light into the plurality of launch sections.

In accordance with some preferred embodiments of the present invention the launch port guides light into the fiber coil from two directions. In one preferred embodiment, two diode stripes and two optical connectors direct light into two sides of the launch port, which is generally trapezoidal in section. In another preferred embodiment, a single diode stripe provides light into a single side of the launch port, but residual light re-emerging from the fiber into the launch port is reflected back into the fiber using suitable reflection within the launch port. In another preferred embodiment, one side of the launch port is transmissive at a first wavelength and reflective at a second, while the other side is conversely transmissive at the second wavelength and reflective at the first wavelength, so that pump light may be guided into the launch port from two directions while residual light is reflected back into the fiber to enhance efficiency. In yet another preferred embodiment, pump light from two laser diode stripes is first polarized transversely to each other, and is then combined in a beam-splitting device so that the input optical power is nearly doubled. The optical power thus obtained is delivered to one entry face of the launch port. In another preferred embodiment, optical power from a similar arrangement using two additional laser diode stripes may be delivered to the opposite side of the same launch port. In yet another preferred embodiment, two such combined sources providing light at two different wavelengths may be directed into two faces of a launch port, and each launch port face may be conductive at one of the wavelengths and transmissive at the other to form a high-power and efficient pumping mechanism. The present invention can use either single-clad or double-clad fibers.

DETAILED DESCRIPTION

Figure 1:
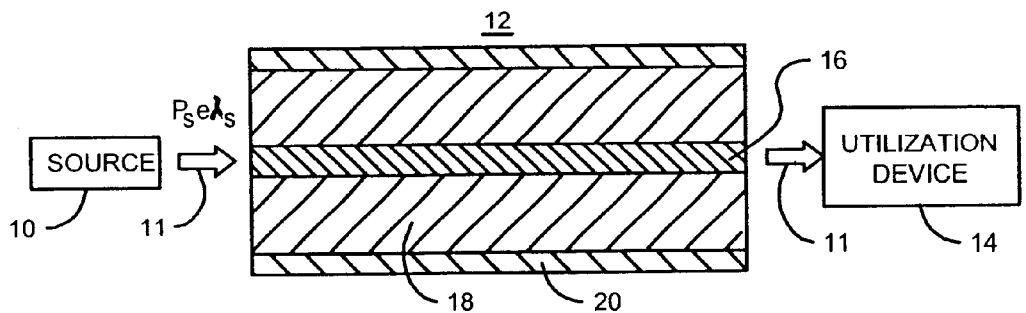
FIG. 1 is a cross-section of a prior art optical fiber, light source and utilization device.
Figure 2:
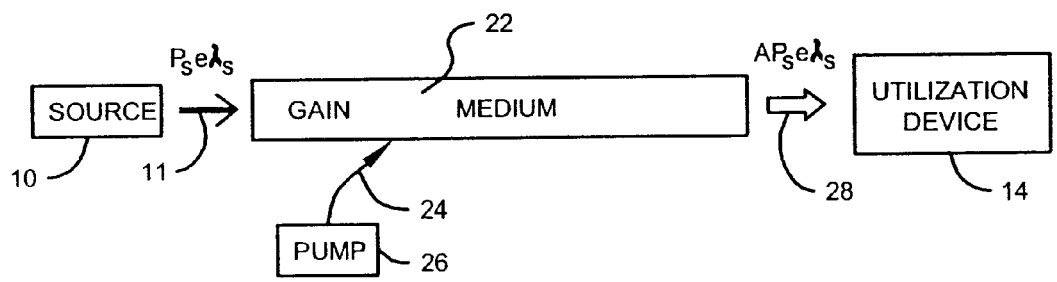
FIG. 2 shows in schematic form a fiber optics system of the prior art wherein a fiber, light source and utilization device has a gain medium employing an optical pump.
Figure 3:
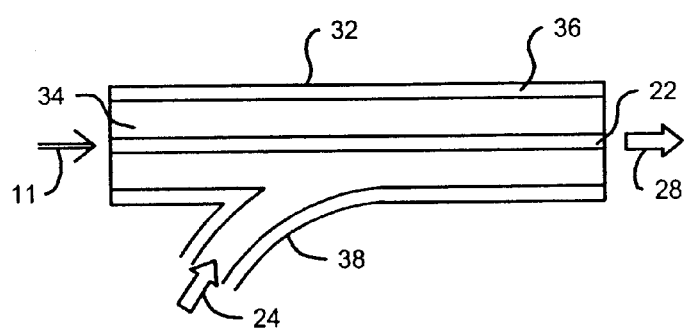
FIG. 3 represents a tapered pump fiber connection to an information carrying fiber.
Figure 4:
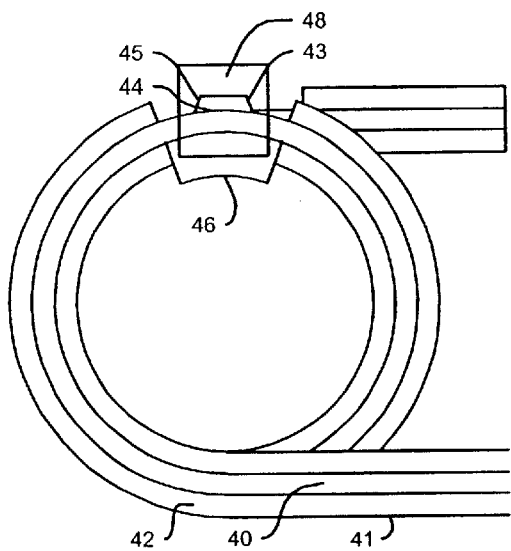
FIG. 4 is a side view of a double-clad doped fiber embodiment of the present invention.

The present invention preferably utilizes a rare earth-doped fiber as an active gain medium of the fiber laser or amplifier. Doped fiber 41 is arranged into coils as shown in FIG. 4 for one preferred configuration. Doped fiber 41 is preferably cladding pumped (CP) fiber, with inner cladding 40 having a rectangular cross-section; the active medium core is not shown in FIG. 4. Outer cladding 42 is stripped off in the vicinity of launch port 44 and support block 46. The stripped sections of the fiber are placed optically contacting support block 46 (with an intervening substrate, if needed, as discussed later) to form an upwardly convex launch region thereupon. In this embodiment the fiber in the launch region is attached to support block 46 by a low index adhesive (e.g. DuPont Teflon™ AF1600) and then polished flat to accommodate launch port 44, which is disposed thereabove, as will be seen more clearly in FIGS. 7 and 8 which show detail area 48. Launch port 44 has a first pump light entry face 43 and a second pump-light entry face 45. Except in the vicinity of detail area 48, the depiction in FIG. 4 of coils of doped fiber 41 is merely schematic, and the coils need not be particularly arranged.

Support block 46 shapes the fibers appropriately in the launch area. Inner cladding 40 typically is made of fused silica, $n_{cl}=1.45$. To minimize losses, inner cladding 40 should be disposed upon a substrate material of low index relative to the cladding index, such as Dupont Teflon™ AF1600 ($n_S\sim1.3$) or $MgF_2$ ($n_S\sim1.373$). A thin layer of AF1600, for example, may be applied to a support block 46 made of any compatible material to form the low-index substrate. Alternatively, the entire support block 46 may be made of a low index polymer such as $MgF_2$, and no separate substrate is then needed.

Figure 5:
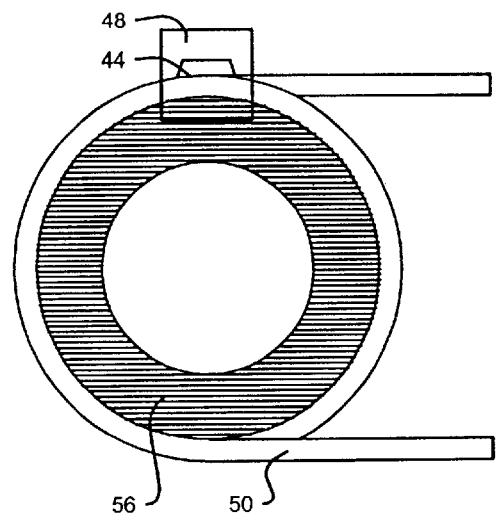
FIG. 5 is a side view of a single-clad doped fiber embodiment of the present invention.

FIG. 5 shows an alternative embodiment of the present invention utilizing single-clad doped fiber 50 which preferably has a rectangular cross-section. In this embodiment single-clad fiber 50 may be wound tightly on support cylinder 56. It should be noted that shapes other than a cylinder may be used as a support, such as oval or eccentric shapes, to vary the loop length independently of the launch region curvature. It is primarily necessary to establish a proper curvature in the launch region in detail area 48, so that launch port 44 will properly mate to the sections of fiber 50 upon which launch port 44 is disposed, as described in more detail with regard to FIGS. 7 & 8.

Figure 6:
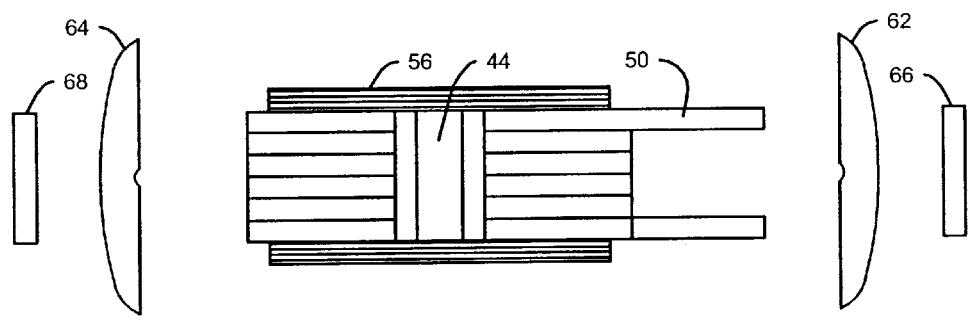
FIG. 6 is a top schematic view of the embodiment of FIG. 5 with dual pump light sources.

FIG. 6 is a top view of the embodiment of FIG. 5. Launch port 44 covers a plurality of launch sections (hidden behind launch port 44) of doped fiber 50, which is wrapped around support 56. Lens 62 schematically represents optics which may be needed to focus the light from diode stripe 66 onto launch port 44, and similarly lens 64 represents optics to focus the light from diode stripe 68 onto launch port 44. However, a diode stripe providing a narrow beam may be mounted on or near the launch port without intervening optics, particularly if the launch port entry face acts as a focusing lens. It can be seen that the launch sections of fiber 50 are best arranged laterally adjacent each other so as to maximize the efficiency of light transfer from diode stripes 66, 68 into the cladding of fiber 50.

Figure 7:
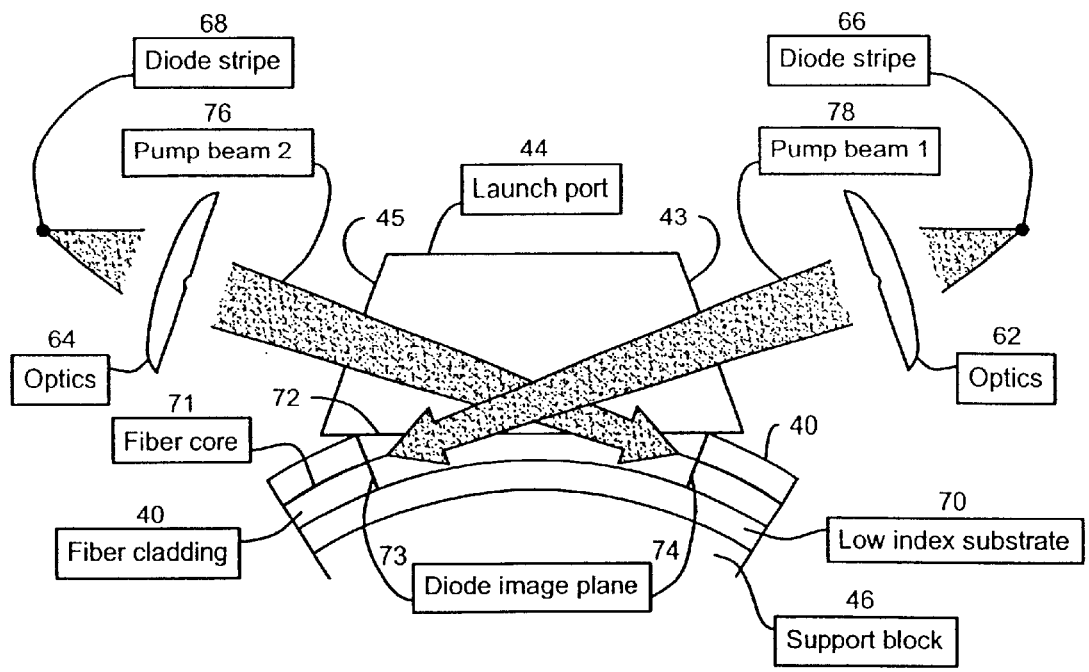
FIG. 7 is a detail view of the launch port area of the embodiment of FIG. 4.

FIG. 7 shows, in side view, detail area 48 as referenced in FIGS. 4 & 5. The trapezoidal cross section of typical launch port 44, including pump light entry faces 43 and 45, can be more clearly seen. Low index substrate 70 is used in this embodiment above support block 46, which accordingly may be formed from a wide range of materials, so long as they are dimensionally stable at operating temperatures and are compatible with the substrate material used (e.g. Teflon™ AF1600). Fiber core 71 is doped with rare-earth elements to form the gain medium. In the preferred embodiment, the bottom of launch port 44 is flat, and inner cladding 40 is polished flat to mate therewith. In this embodiment, pump light entry faces 43 and 45 are preferably shaped perpendicular to the direction of the pump beam propagation, and given an anti-reflection (AR) coating.

The launch port may be attached to the fibers in the launch region by gluing, optical contact, or diffusion-bonding. For embodiments in which the power densities are not excessive, low-absorption optical glue having an index of refraction matched to that of the cladding and launch port may be used, and is available commercially (e.g. from Nye Optical Products of Fairhaven, Mass.). For higher power embodiments which are not subject to excessive vibration, optical contact may be used. Diffusion bonding may also be used for higher power, but has special design issues because the high temperatures needed for diffusion bonding are not compatible with Teflon™ AF1600, nor with the outer cladding of most double-clad fibers.

The light emitted by first diode stripe 66, seen here in end section, is gathered by first optics 62 to form first pump beam 78, which traverses first pump light entry face 43 to focus upon first diode image plane 73, and is thus reasonably well aligned within fiber cladding 40 after traveling through launch port/cladding interface 72. Second diode stripe 68 pumps light into second optics 64 to form second pump beam 76, which traverses second pump light entry face 45 and interface 72 to focus on second diode image plane 74, well aligned with cladding 40 in a direction opposite that of first pump beam 76.

The pump power launched into fiber inner cladding 40 propagates along the fiber, being absorbed in the process by rare-earth dopants in core 71. It is desirable that all pump power is absorbed, since this maximizes the device efficiency. However, pump radiation remaining after one round trip in the fiber will experience losses at the launch port. Two general approaches are presented for minimizing losses due to increasing the efficiency of the system. Modifying the launch port to reflect light re-emerging into the port after traveling through an absorptive section is discussed with respect to FIGS. 8 and 9. Employing fiber loops long enough to absorb most of the pump light is discussed below.

One approach to achieve good absorption is to select sufficient loop length for doped fiber 41. The loop length of doped fiber 41 (FIG. 4) is preferably chosen such that 90% of pump power is absorbed per round trip. As an example, consider an Er/Yb—doped double cladding fiber amplifier operating at 1.55 $\mu$m in the embodiment shown in FIGS. 4 and 6. Pump absorption length (1/e) in the core $l_{co}$=0.7 cm at 980 nm and 2.1 cm at 920 nm, respectively. The pump absorption length in the cladding is scaled by the ratio of the cladding and core areas $A_{cl}/A_{co}$, i.e., $l_{cl}=l_{co}A_{cl}/A_{co}$. Assuming 8 $\mu$m core diameter and 80 $\mu$m rectangular cladding, $l_{cl}$=89 cm and 267 cm for 980 nm and 920 nm pump radiation, respectively. Therefore, 90% of 980 nm and 920 nm pump is absorbed in 205 cm and 615 cm long fibers, respectively. In high power applications, shorter fiber length is often desirable, since it reduces the chances of developing parasitic nonlinear effects. It may be seen from the above that reducing the ratio of cladding to core areas $A_{cl}/A_{co}$ will permit the overall fiber length to be reduced. Preferable loop lengths for other gain mediums and pump light wavelengths may be calculated in a similar manner. Although 90% absorption is preferred, tradeoffs between absorption efficiency and parasitic losses may indicate that shorter lengths be used; and if parasitic losses are small, then exceeding the 90% absorption length may be useful.

The overall fiber length is the product of the length of absorptive sections (plus a small launch section) by the number of such absorptive sections or "turns". The number of turns is determined by matching the useful width of the launch port to the desired pump source 66, 68. The useful width of the pump port is determined by the total width of adjacent fibers, rather than by the width of the trapezoidal block bonded to the fibers, which may be enlarged for manufacturing convenience. Consider a 400 micron long single-stripe diode source emitting 3 W, such as is readily available commercially.

Cylindrical optics with M=1 magnification in the stripe direction may be used for coupling the pump power through launch port 44, which therefore should be at least 400 microns wide. A typical square cross-section inner cladding is 80 $\mu$m on a side. Five 80 $\mu$m fiber loops will add to the total length of the source diode. In this configuration, 10.3 m fiber length is required if 980 nm pumping is chosen. Other lengths of stripe diodes are available; indeed, they may be 10,000 microns long if manufactured as a sequence of end-to-end diodes. Longer diodes will generally have higher power output, and can accommodate a larger number of fiber turns. For use with most of the preferred embodiments of the present invention, which employ a plurality of adjacent launch sections to form the launch region, a diode stripe emitting area would preferably be at least 150 microns long. However, for a single-strand launch port, in which a launch port is mated to a single special fiber launch section, the diode stripe could be much shorter. As for width, present pump diode stripes are typically less than 4 microns wide; however, much wider diodes, as available, are compatible with the present invention.

To determine the appropriate magnification of the optics for the direction perpendicular to the source diode stripe long axis, numerical aperture of the cladding beneath the launch port, NA=$(n_{cl}^2-n_s^2)^{1/2}$, should be considered so that the entire pump beam is captured by the cladding. It is always advantageous to have maximum possible numerical aperture, since it can accommodate beams of inferior quality or, alternatively, permit more efficient launch port geometry which reduces power scattering of the non-absorbed portion of the pump beam. Maximum numerical aperture is achieved by using substrates (see FIGS. 7, 8) having the lowest refraction index, e.g., those covered with Teflon™ AF1600. Since this substrate is not compatible with some assembly techniques, such as diffusion bonding, consider first a less optimal substrate, i.e. a support block 46 made of MgF$_2$, which has a relatively high refraction index. For fused silica cladding on a MgF$_2$ substrate, NA=0.45, which is somewhat less than the NA~0.5 of the diode bars in the direction perpendicular to the stripe. Therefore, magnification M>1.1 should be used for this direction. However, at this magnification the focal spot width of the beam is not much greater than the width of the diode stripe, 1 micron, while the cladding into which the beam is focused is typically about 80 microns wide. There is thus a great deal of room to increase the focus spot size, permitting the use a larger magnification, e.g. M=5. Such a larger magnification reduces the NA of the pump beam at the launch port, thereby reducing system losses. Below, we assume M=5, which results in NA=0.1 of the pump beam at the port.

The height H of the trapezoidal launch port should be large enough to accommodate the whole beam at the pump light entry faces, which results in the restriction H>2 NA L/2n, where L is the overall length of the trapezoid, and n is the refraction index of the launch port material. For H=1 mm, this gives L<10 mm. The length L of the longest side of the trapezoid cross-section of launch port 44 should exceed the length l of the physical contact along interface 72 between launch port 44 and the polished fiber. For polishing depth d=30 μm, and support block 46 radius R=10 cm, one gets length l of interface 72 contact=2(2 R d)$^{1/2}$=4.9 mm, which is less than the maximum L determined above. The length of the polished area and that of the launch block may be reduced by choosing a shallower polished depth. This may result in smaller scattering losses.

Figure 8:
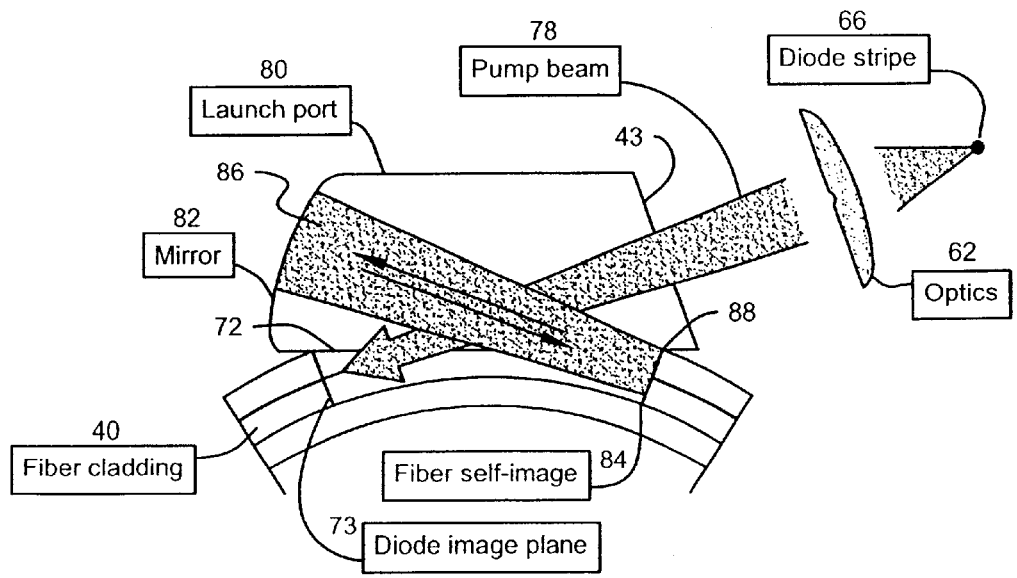
FIG. 8 is a single-source, return reflecting embodiment of the FIG. 7 launch port.

It may sometimes be difficult, for some wavelength and gain medium combinations, to provide adequate loop length to absorb the bulk of the pump light within a single round trip. This is a particular problem for the configuration shown in FIG. 5, because there the diameter of the support cylinder is practically limited to tens of centimeters and thus the loop length is proportionally limited. FIG. 8 shows an additional approach to enhance coupling efficiency, reducing losses at the port by redirecting escaping pump light back into the fiber. In FIG. 8, pump light is provided from one side of the launch port, and light escaping the fiber after completing a trip around the fiber is returned to the fiber by means of a mirror positioned on the other side of the port. As before, diode stripe 66 provides light which is focused by optics 62 to provide pump beam 78, which traverses pump light entry face 43 and interface 72 to image on diode image plane 73, sending pump beam 78 into cladding 40, with which it is well aligned. Mirror 82 replaces the second pump light entry face to create single-entry launch port 80. Mirror 82 is preferably made by polishing a spherical surface on one side of the port and depositing a reflecting coating onto it. The mirror images the output plane, 84, of the fiber, which crosses the fiber at the right angle at edge 88 of interface 72 between launch port 80 and fiber cladding 40, back onto itself. Thus, residual pump light 86, emerging into the launch port from fiber self-image plane 84 after traveling around an absorptive loop of the fiber, is reflected back into cladding 40 by mirror 82.

Figure 9:
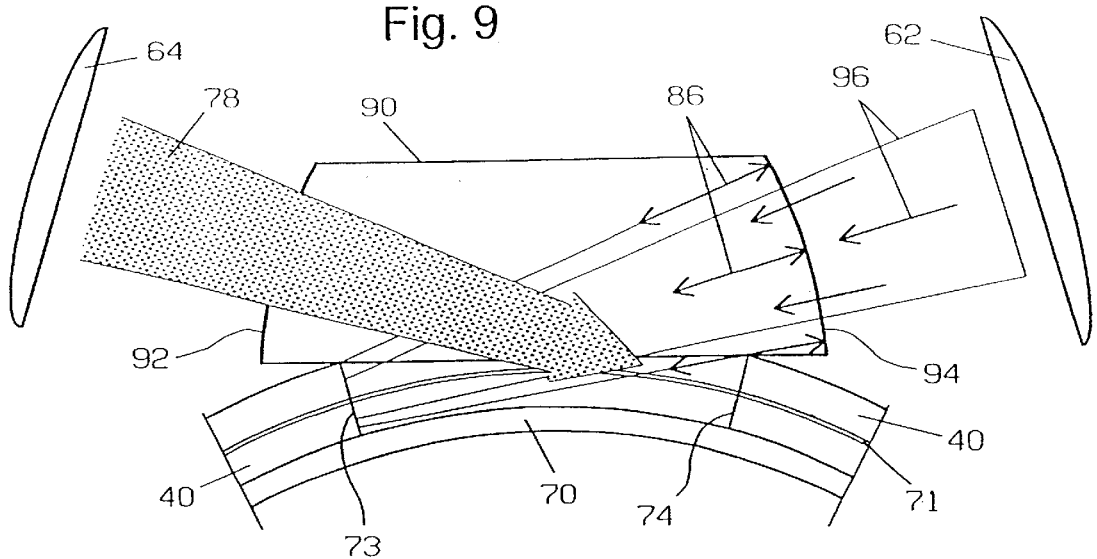
FIG. 9 is a two wavelength, dual source, conductive/reflective launch port.

FIG. 9 shows an embodiment employing the principles of both FIG. 7 and FIG. 8, utilizing a two-sided launch port which also reflects, back into the cladding, light which is escaping after a round trip through an absorptive fiber loop. First pump beam 78 having a first wavelength $\lambda_1$ (which may be 915 nm, for example) is provided and focused through optics 64 and launch port 90 into fiber cladding 40 at focal plane 74. Pump light which remains unabsorbed after one round trip through fiber cladding 40 may emerge back into launch port 90 beginning at plane 73 (where launch port 90 mates to fiber cladding 40) as escape light 86, still at $\lambda_1$, while low index substrate 70 impedes escape in that direction. A transmissive/reflective coating is provided on launch port face 94 to reflect light of first wavelength $\lambda_1$ back into fiber cladding 40, and to transmit light of second wavelength $\lambda_2$ (925 nm, for example) which is input from a source, through optics 62, as second pump beam 96.

While launch port entry face 94 is thus transmissive for light of $\lambda_2$ and reflective for light of $\lambda_1$, the coating of launch port entry face 92 is transmissive to light of $\lambda_1$ but reflective to light of $\lambda_2$. Therefore, residual light at $\lambda_2$ from pump beam 96 remaining after traveling around a loop of fiber will similarly be reflected back into the cladding.

Ytterbium is a preferred rare-earth dopant for the embodiment shown in FIG. 9 due to its broad absorption band at around 920 nm which enables it to efficiently absorb pump light at wavelengths differing by at least 10 nm, e.g. 915 vs. 925 nm. Yb could also be used with pump light at two wavelengths of around 920 nm and around 978 nm. The coating of one launch port entry face would thus transmit light having a wavelength around 920 nm and reflect light with a wavelength around 978 nm, while the coating of the other launch port entry face would behave conversely. The same principle of inversely symmetrical reflection and transmission may be employed with any gain medium which absorbs well at two wavelengths differing enough that a surface transmissive to one and reflective to the other is within the skill in the art.

Figure 10:
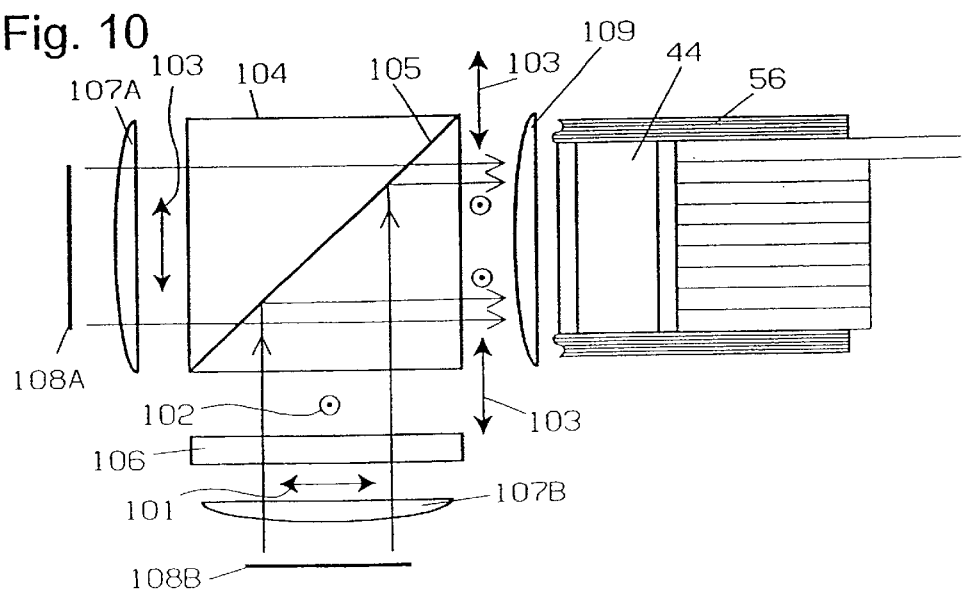
FIG. 10 depicts combining two pump sources for one launch port entry face.

FIG. 10 shows an approach for increasing the light coupled into fiber cladding 40 by a polarized combination of two source beams. Polarizing beam-splitting cube 104 directly transmits light from pump diode stripe 108A which is collimated by optics 107A and is polarized as shown by indication 103. Diode stripe 108B provides light polarized as shown in 101, which polarization is then shifted by polarization half-wave plate 106 such that the polarization of the light emerging from half-wave plate 106 is as shown by indication 102. The light thus polarized is reflected 90 degrees by polarizing beam-splitting cube 104, such that it emerges in the same direction as the light from diode 108A. Before entering launch port 44 (shown on support cylinder 56), the combined beams (polarized perpendicularly to each other) are refocused by lens 109.

Figure 11:
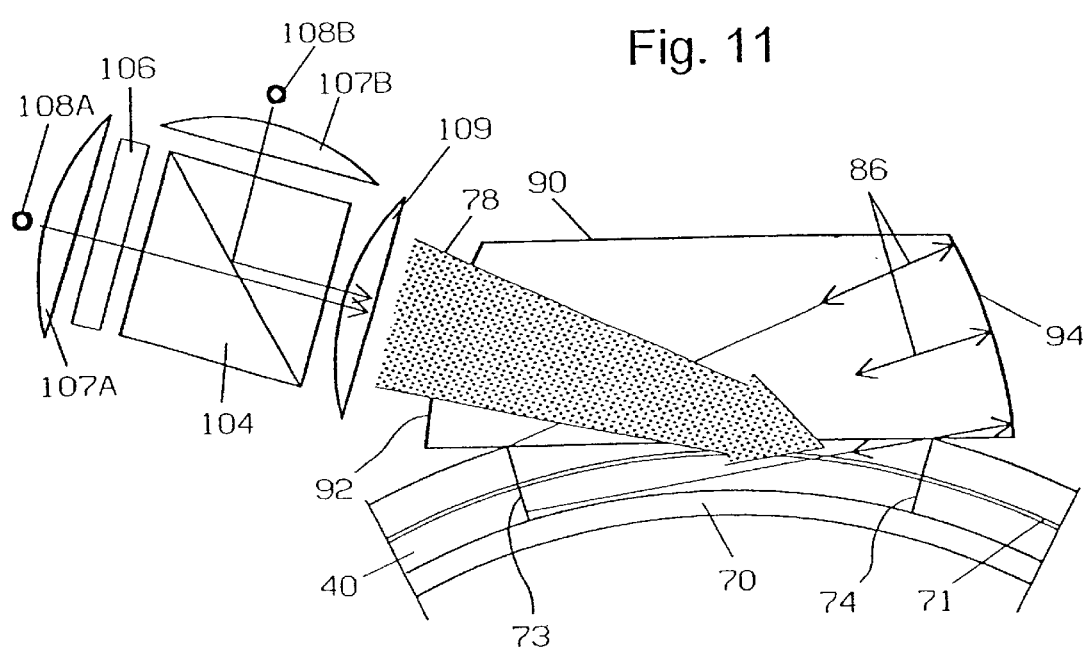
FIG. 11 shows an alternative polarizing combination of two pump sources.

Variations on the combination of beams through light polarization control which is illustrated in FIG. 10 are possible. For example, FIG. 11 shows diode stripes 108A and 108B oriented parallel to each other (perpendicular to the page), which is also parallel to the width of launch port 90. Polarizing beam splitter 104 is elongated to form a rectangular parallelpiped which extends at least the length of diode stripes 108A and 108B (in the direction into the paper). Collimating lenses 107A and 107B and polarization half-wave plate 106 perform the same function as in FIG. 10, providing collimated beams orthogonally polarized to each other such that the rotated beam from pump diode 108A directly traverses beamsplitter 104, while the beam from 108B is reflected 90 degrees by beamsplitter 104. The combined pump light from diode stripes 108A and 108B form beam 78. FIG. 11 shows beam 78 entering fiber cladding 40 only through face 92 of launch port 90 to focus on focal plane 74. After traveling a loop of the fiber, residual light 86 re-entering launch port 90 at intersection plane 73 will be reflected from face 94, which is reflectively coated.

The beam combining of FIG. 11 may be used with the arrangement of FIG. 9 so as to effectively input the light from four pump diodes into fiber cladding 40. In this case, output power of the device may be estimated by assuming that the output of two 3 W diodes is combined with polarization coupling at each end of the launch port, thereby bringing the total available power to 12 W, less the inevitable losses. With 80% coupling efficiency, in excess of 9 W of pump power is coupled, and in excess of 8 W is actually absorbed by the active medium. Typically, 40% conversion efficiency is anticipated for an Er/Yb amplifier, resulting in more than 3 W output from a single amplifier stage. If more power is required, several stages may be employed with Faraday isolators spliced in between stages.

The present invention has been described in its preferred and alternative embodiments. Each embodiment is further functional with a wide range of pump source diode lengths, at least from 150 microns to 10,000 microns long. Moreover, the invention may be practiced with a wide range of gain mediums, as are now or may become known in the art, and with a wide range of fiber sizes and materials. It is readily scalable to higher or lower powers, and is susceptible to numerous modifications and embodiments within the ability of those skilled in the art. Thus, it should be understood that various changes in form and usage of the present invention may be made without departing from the spirit and scope of this invention, which accordingly is defined only by the following claims.

What is claimed is:

1. A method of pumping an optical fiber comprising the steps of:
   providing a special optical fiber having a core and a first cladding layer, the fiber having a gain medium for absorbing optical pump light;
   defining at least one launch section of the special optical fiber followed by an absorption section thereof;
   forming said at least one launch section into an upwardly convex launch region where a concave side of the first cladding layer contacts a transparent low refraction index material;
   disposing a launch port upon said launch region;
   directing pump light from one or more pump sources through optics into an entry face of the launch port, the launch port substantially conducting the pump light into the first cladding of the at least one launch section in a direction approximately tangent to the center of the launch section,
   wherein the step of forming said at least one launch section into an upwardly convex launch region includes disposing the at least one launch section above a support block presenting a surface having an index of refraction less than 1.45 to the at least one launch section.

2. The method of claim 1 wherein the step of defining at least one launch section of the special optical fiber followed by an absorption section thereof includes defining a plurality of launch sections having an absorption section therebetween, including the further step of:
   positioning the plurality of launch sections substantially adjacent each other, each launch section of the plurality of launch sections having a center defined by the core of the special optical fiber, the center of each launch section defining an intersection curve, the intersection curve substantially intersecting a traversal plane;
   wherein forming a launch region includes forming said plurality of launch sections upwardly convex with a transparent low refraction index material below the first cladding layers.

3. The method of claim 2 in which the intersection curve is substantially a line segment.

4. The method of claim 2 wherein a multiplicity of launch sections are defined and positioned adjacent each other.

5. The method of claim 2 including mating the launch port to the launch sections in the launch region at a flat interface.

6. The method of claim 5 including the step of gluing the launch port to the launch region.

7. The method of claim 5 including the step of diffusion bonding the launch port to the launch sections at the launch region.

8. The method of claim 2 including the step of supplying a pump light beam from a diode stripe having an emitting area greater than 150 microns long.

9. The method of claim 2 including the step of stripping the special optical fiber down to the first cladding layer in the launch region.

10. A method of pumping an optical fiber comprising the steps of:
    providing a special optical fiber having a core and a first cladding layer, the fiber having a gain medium for absorbing optical pump light;
    defining at least one launch section of the special optical fiber followed by an absorption section thereof;
    forming said at least one launch section into an upwardly convex launch region where a concave side of the first cladding layer contacts a transparent low refraction index material;
    disposing a launch port upon said launch region;
    directing pump light from one or more pump sources through optics into an entry face of the launch port, the launch port substantially conducting the pump light into the first cladding of the at least one launch section in a direction approximately tangent to the center of the launch section,
    wherein the step of defining at least one launch section of the special optical fiber followed by an absorption section thereof includes defining a plurality of launch sections having an absorption section therebetween, including the further step of:
    positioning the plurality of launch sections substantially adjacent each other, each launch section of the plurality of launch sections having a center defined by the core of the special optical fiber, the center of each launch section defining an intersection curve, the intersection curve substantially intersecting a traversal plane,
    wherein forming a launch region includes forming said plurality of launch sections upwardly convex with a transparent low refraction index material below the first cladding layers and wherein the step of forming said at least one launch section into an upwardly convex launch region includes disposing the at least one launch section above a support block presenting a substrate having an index of refraction less than 1.45 as a surface against which the first cladding of the at least one launch section is disposed.

11. The method of claim 1 wherein a cross-section of the first cladding layer of the special optical fiber is rectangular.

12. The method of claim 1 wherein the special optical fiber has double cladding.

13. A method of pumping an optical fiber comprising the steps of:
    providing a special optical fiber having a core and a first cladding layer, the fiber having a gain medium for absorbing optical pump light;
    defining at least one launch section of the special optical fiber followed by an absorption section thereof;
    forming said at least one launch section into an upwardly convex launch region where a concave side of the first cladding layer contacts a transparent low refraction index material;
    disposing a launch port upon said launch region;
    directing pump light from one or more pump sources through optics into an entry face of the launch port, the launch port substantially conducting the pump light into the first cladding of the at least one launch section in a direction approximately tangent to the center of the launch section,
    wherein the step of defining at least one launch section of the special optical fiber followed by an absorption section thereof includes defining a plurality of launch sections having an absorption section therebetween, including the further step of:

positioning the plurality of launch sections substantially adjacent each other, each launch section of the plurality of launch sections having a center defined by the core of the special optical fiber, the center of each launch section defining an intersection curve, the intersection curve substantially intersecting a traversal plane, wherein forming a launch region includes forming said plurality of launch sections upwardly convex with a transparent low refraction index material below the first cladding layers and including the further steps of:

supplying a second pump light beam and interposing second optics to direct the second pump light beam into a second face of the launch port.

14. A method of pumping an optical fiber comprising the steps of:

providing a special optical fiber having a core and a first cladding layer, the fiber having a gain medium for absorbing optical pump light;

defining at least one launch section of the special optical fiber followed by an absorption section thereof;

forming said at least one launch section into an upwardly convex launch region where a concave side of the first cladding layer contacts a transparent low refraction index material;

disposing a launch port upon said launch region;

directing pump light from one or more pump sources through optics into an entry face of the launch port, the launch port substantially conducting the pump light into the first cladding of the at least one launch section in a direction approximately tangent to the center of the launch section, wherein the step of defining at least one launch section of the special optical fiber followed by an absorption section thereof includes defining a plurality of launch sections having an absorption section therebetween, including the further step of:

positioning the plurality of launch sections substantially adjacent each other, each launch section of the plurality of launch sections having a center defined by the core of the special optical fiber, the center of each launch section defining an intersection curve, the intersection curve substantially intersecting a traversal plane, wherein forming a launch region includes forming said plurality of launch sections upwardly convex with a transparent low refraction index material below the first cladding layers and wherein said face is a first face, and including the further step of causing a second face of the launch port to reflect light emerging into the launch port from the special fiber back into the special fiber and wherein said second face is reflective of a first wavelength of pump light and admits a second wavelength of pump light into the launch port.

15. The method of claim 14 wherein said first face is transmissive of said first wavelength of pump light and reflective of said second wavelength of pump light.

16. A method of pumping an optical fiber comprising the steps of:

providing a special optical fiber having a core and a first cladding layer, the fiber having a gain medium for absorbing optical pump light;

defining at least one launch section of the special optical fiber followed by an absorption section thereof;

forming said at least one launch section into an upwardly convex launch region where a concave side of the first cladding layer contacts a transparent low refraction index material;

disposing a launch port upon said launch region;

directing pump light from one or more pump sources through optics into an entry face of the launch port, the launch port substantially conducting the pump light into the first cladding of the at least one launch section in a direction approximately tangent to the center of the launch section, wherein the step of defining at least one launch section of the special optical fiber followed by an absorption section thereof includes defining a plurality of launch sections having an absorption section therebetween, including the further step of:

positioning the plurality of launch sections substantially adjacent each other, each launch section of the plurality of launch sections having a center defined by the core of the special optical fiber, the center of each launch section defining an intersection curve, the intersection curve substantially intersecting a traversal plane, wherein forming a launch region includes forming said plurality of launch sections upwardly convex with a transparent low refraction index material below the first cladding layers, wherein the pump light entering said launch port face is provided from two separate pump light sources and wherein said pump light from two sources is polarized orthogonally and combined into a single beam by a polarizing beam splitter.

17. A method of pumping an optical fiber comprising the steps of:

providing a special optical fiber having a core and a first cladding layer, the fiber having a gain medium for absorbing optical pump light;

defining at least one launch section of the special optical fiber followed by an absorption section thereof;

forming said at least one launch section into an upwardly convex launch region where a concave side of the first cladding layer contacts a transparent low refraction index material;

disposing a launch port upon said launch region;

directing pump light from one or more pump sources through optics into an entry face of the launch port, the launch port substantially conducting the pump light into the first cladding of the at least one launch section in a direction approximately tangent to the center of the launch section, wherein the step of defining at least one launch section of the special optical fiber followed by an absorption section thereof includes defining a plurality of launch sections having an absorption section therebetween, including the further step of:

positioning the plurality of launch sections substantially adjacent each other, each launch section of the plurality of launch sections having a center defined by the core of the special optical fiber, the center of each launch section defining an intersection curve, the intersection curve substantially intersecting a traversal plane, wherein forming a launch region includes forming said plurality of launch sections upwardly convex with a transparent low refraction index material below the first cladding layers, wherein the pump light entering said launch port face is provided from two separate pump light sources and wherein light from third and fourth pump light sources is combined and directed through a second face of the launch port into the special fiber.

18. A device for pumping light energy into an optical fiber, comprising:
special optical fiber having:
a gain medium for absorbing optical pump light;
a first cladding layer having a cladding index of refraction;
at least one launch section and
an absorbing section;
launch region where said at least one launch section is upwardly convex and said first cladding layer optically contacts transparent low refraction index material on a concave side;
pump light source providing a beam of pump light through optics; and
launch port, the launch port having an index of refraction substantially matching the cladding index of refraction and being optically mated to said at least one launch section in the launch region, the launch port having a face accepting light from the pump light source guiding it into the first cladding layer of the special optical fiber,
wherein said at least one launch section is plurality of launch sections, each separated axially along the special optical fiber from another by an absorption section of the special optical fiber, each launch section disposed adjacent another to form the upwardly convex launch region above the transparent low refraction index material, wherein the launch port is optically mated to all of the launch sections and wherein the first cladding layer of the launch sections of the special optical fiber is disposed on a supporting block surface having an index of refraction less than 1.45.

19. The device of claim 18 wherein in the launch region the launch sections of the special optical fiber have no covering outside of the first cladding layer.

20. The device of claim 18 wherein the launch port is mated to the special optical fiber in the launch region with optical glue.

21. The device of claim 18 wherein the launch port is mated to the special optical fiber in the launch region by optical contact.

22. The device of claim 18 wherein the launch port is mated to the special optical fiber in the launch region by diffusion-bonding.

23. The device of claim 18 wherein the launch sections of the special optical fiber are aligned adjacent each other such that a plane tangent to each launch section is substantially tangent to each other of the plurality of launch sections.

24. The device of claim 18 wherein the upwardly convex launch region of the special optical fiber has a polished flat surface against which the launch port is mated.

25. The device of claim 18 wherein the special optical fiber is a double-cladding fiber in which the first cladding has a rectangular cross-section.

26. A device for pumping light energy into an optical fiber, comprising:
special optical fiber having:
a gain medium for absorbing optical pump light;
a first cladding layer having a cladding index of refraction;
at least one launch section and
an absorbing section;
launch region where said at least one launch section is upwardly convex and said first cladding layer optically contacts transparent low refraction index material on a concave side;
pump light source providing a beam of pump light through optics; and
launch port, the launch port having an index of refraction substantially matching the cladding index of refraction and being optically mated to said at least one launch section in the launch region, the launch port having a face accepting light from the pump light source guiding it into the first cladding layer of the special optical fiber,
wherein said at least one launch section is plurality of launch sections, each separated axially along the special optical fiber from another by an absorption section of the special optical fiber, each launch section disposed adjacent another to form the upwardly convex launch region above the transparent low refraction index material, wherein the launch port is optically mated to all of the launch sections and wherein said pump light source is a first pump light source, the device further comprising a second pump light source and a second face of the launch port to accept said second pump light source.

27. A device for pumping light energy into an optical fiber, comprising:
special optical fiber having:
a gain medium for absorbing optical pump light;
a first cladding layer having a cladding index of refraction;
at least one launch section and
an absorbing section;
launch region where said at least one launch section is upwardly convex and said first cladding layer optically contacts transparent low refraction index material on a concave side;
pump light source providing a beam of pump light through optics; and
launch port, the launch port having an index of refraction substantially matching the cladding index of refraction and being optically mated to said at least one launch section in the launch region, the launch port having a face accepting light from the pump light source guiding it into the first cladding layer of the special optical fiber,
wherein said at least one launch section is plurality of launch sections, each separated axially along the special optical fiber from another by an absorption section of the special optical fiber, each launch section disposed adjacent another to form the upwardly convex launch region above the transparent low refraction index material, wherein the launch port is optically mated to all of the launch sections, wherein said launch port face is a first face, the device further comprising a second face of the launch port to reflect pump light emerging into the launch port from the special fiber back into the special fiber and wherein said second face is reflective of a first wavelength of pump light and admits a second wavelength of pump light into the launch port.

28. The device of claim 18 wherein said pump light source includes pump light from more than one pump light diode.

29. The device of claim 18 wherein said pump light source derives from at least two source beams polarized orthogonally to each other and combined into a single beam by a polarizing beam splitter.

30. The device of claim 26 further wherein said first and second pump light sources each include pump light from more than one pump light diode.

31. The device of claim 26 wherein said first and second pump light sources each include pump light from a plurality of sources polarized and combined in a polarizing beam splitter.

32. The device of claim 26 wherein said first pump light source has a first wavelength and said second pump light source has a different second wavelength;

said first launch port face transmits light having said first wavelength and reflects light having said second wavelength;

said second launch port face transmits said second wavelength and reflects said first wavelength; and said gain medium is absorptive of pump light at said first wavelength and of pump light at said second wavelength.

33. The device of claim 32 wherein said first and second pump light sources each include pump light from a plurality of sources polarized and combined in a polarizing beam splitter.

* * * * *